Aug. 18, 1964

C. F. BACK 3,144,998

HOIST CONTROL

Filed Dec. 24, 1962

INVENTOR.
CARL F. BACK

BY *Hamilton & Cook*

ATTORNEYS

United States Patent Office

3,144,998
Patented Aug. 18, 1964

3,144,998
HOIST CONTROL
Carl F. Back, Orrville, Ohio, assignor to The Sanderson Cyclone Drill Company, Orrville, Ohio, a corporation of Ohio
Filed Dec. 24, 1962, Ser. No. 246,835
2 Claims. (Cl. 242—157.1)

The present invention relates to hoists or cable drums. More particularly, the invention relates to apparatus for positively controlling the sidewise or lateral movement of idler sheaves provided to align the cable or rope during winding or unwinding on the drum. Specifically, the invention relates to improved cable drum apparatus having a level wind particularly suited for controlling a run of cable during winding and unwinding and also for controlling cable position during short reciprocating movements of the cable such as occur in well drilling operations.

Where there is side draft or bias on a hoist cable, moveable idler sheaves are provided to align the cable and the drum surface. The idlers may be moved parallel to the face of the drum by the side pressure of the cable or, preferably, be driven positively sideways to reduce or eliminate friction and increase the life of the cable and to level wind multiple layers of cable.

In the prior art, a positive idler sheave drive has been provided by various types of apparatus construction characterized by some form of direct synchronized connection between the drum and the sheave. In one form the idler sheave revolves between fixed collars on a horizontal shaft spaced parallel to the drum and connected to the drum shaft as by a sprocket and chain. The sprocket supporting the idler shaft has interior threads engaging exterior threads on the end of the shaft. As the sprocket is a nut held from moving sideways, rotation thereof in synchronization with the cable drum moves the shaft with the sheave in the direction of its axis. In an alternative construction, the idler shaft is threaded but held stationary and the sheave hub is a nut. The sheave is turned by friction of the cable, which causes it to travel back and forth. Still another form uses a pair of upright rollers rather than a sheave, the rollers being driven sideways by a screw driven by sprocket and chain from the drive shaft.

It is an object of the present invention to provide apparatus for positively controlling the sidewise or lateral movement of a cable drum idler sheave. The apparatus of the invention provides a positive level wind control without use of the complex mechanical connections heretofore used for positive control as by a direct synchronization of the drum and shaft supporting the sheave.

It is a further object of the invention to provide a hoist or cable drum, with positively controlled idler sheave which is compact, requires a minimum of installation space and little other than routine maintenance; such a hoist being particularly suited for use as the bull reel drum of portable well drilling machines.

These and other objects of the invention, as well as additional advantages thereof, will be apparent in view of the following detailed description and the attached drawing.

Figure 1:
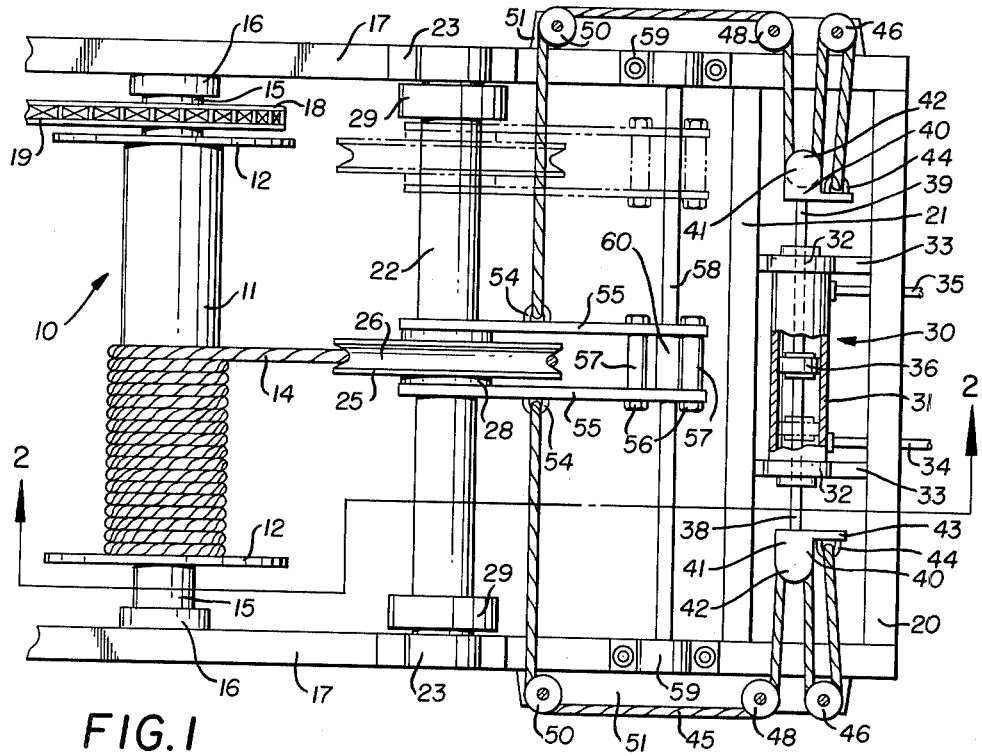
FIG. 1 is a plan view of a hoist, cable drum or bull reel drum having a positively controlled idler sheave apparatus according to the invention.
Figure 2:
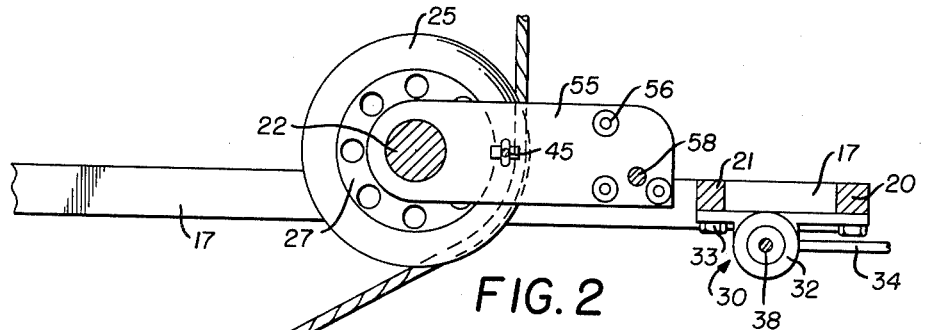
FIG. 2 is a fragmentary side view, taken substantially as indicated on lines 2—2 of FIG. 1.

A hoist or cable drum according to the invention is indicated generally by the numeral 10. The drum of the hoist is mounted on a frame. A stationary shaft is mounted on the frame parallel to the axis of the drum. A sleeve is mounted on the stationary shaft and is slidable longitudinally thereon. The idler sheave, engaging the cable being wound or unwound by the drum, is rotatably carried by the slidable sleeve. Movement of the idler sheave during operation of the drum is controlled by a mechanism or means including a fluid cylinder mounted on the frame spaced apart from the stationary shaft. The cylinder is "double acting," having piston shafts extending from either end connected by a single piston within the cylinder.

The idler sheave control means further includes a fitting on the end of each piston shaft carrying an anchor for a control cable and a small idler pulley. On the frame adjacent to and laterally of the end of each piston shaft are at least two additional small idler pulleys. On each side of the frame there is still another small idler pulley located adjacent to the stationary shaft carrying the idler sheave. The idler sheave is connected to each piston shaft of the fluid cylinder by a control cable extending from each of the anchors on said fittings and trained around the adjacent pulleys on that side of the frame and connected to brackets on the sleeve on opposite sides of the idler sheave.

Referring to the drawings, the drum 11 is of conventional construction having spool end plates 12 for confining the cable or rope 14 being wrapped thereon. If desired the drum surface could have cable grooves for accurate spacing of the first cable wraps. The drum shaft 15 is suitably mounted or journaled in bearing blocks 16 carried by or below side frame members 17. At one end of the shaft 15, between an end plate 12 and a journal mounting 16, is a drum drive sprocket 18 connected as by a chain 19 to a power and transmission unit located remote, if desired, from the hoist 10.

The hoist frame defined by the side members 17 and end member 20, with suitable cross members such as indicated at 21, is generally rectangular although the shape or configuration of the frame may be varied as desired. As shown, the hoist 10 has a construction particularly adapted for use as the bull reel of a portable well drilling machine; further reference being made below to such a bull reel utilization for purposes of explanation.

On the mid portion of the frame a stationary shaft 22 extends between the side frame members 17 having ends mounted thereon as by brackets 23. The shaft 22 is parallel to the axis of the drum 11 and, as shown, is preferably above the upper surface of the drum to facilitate the control action of the idler sheave 25 during winding or unwinding of the cable 14.

The idler sheave 25 has a deep grooved or V-shaped peripheral portion 26 to engage the cable 14. The hub portion 27 of the sheave is adapted as by a bearing (not shown) for rotational mounting around a retaining sleeve 28. The sleeve 28 mounting the idler sheave is slidable longitudinally along the shaft 22. The extent to which the sleeve 28 may slide is limited, as required, by the location of adjustable collars 29 secured to the end portions of the stationary shaft.

Movement of the idler sheave 25 is controlled by a fluid cylinder 30 and connecting linkage. Referring to FIG. 1, the cylinder body 31 is closed at both ends by caps 32 having laterally extending flanges 33 for mounting the cylinder 30 on the hoist frame as by attachment to and between the frame members 20 and 21. The fluid cylinder 30 is double-acting having dual conduits 34 and 35, for selective supply and/or exhaust of fluid under pressure, communicating with the cylinder body adjacent the end caps 32.

Within the cylinder body 31 is a piston 36. Connected to opposite sides of the piston 36 are dual piston shafts 38 and 39. Each piston shaft extends through the adjacent end cap 32 and is directed toward a side frame member 17. On the extending end portion of each piston shaft 38, 39 is a fitting indicated at 40.

Each fitting 40 has a clevis like flange portion 41 for rotatable mounting of a small diameter idler pulley 42. Adjacent each pulley, the fittings have a lateral extension portion 43 mounting an anchor 44 for one end of dual control cables indicated at 45.

Mounted on each side frame member 17, adjacent and laterally of each piston shaft 38 and 39, are at least two additional small diameter idler pulleys 46 and 48. Still another or fourth idler pulley 50 is mounted on each side frame member 17 adjacent the stationary shaft 22. As best shown in FIG. 1, each set of side pulleys 46, 48, 50 may be carried on a common bracket mount 51 attached to each side frame member 17.

Each of the two control cables 45 is connected to a piston shaft 38 or 39 by the anchor 44 on a fitting 40. From the fitting 40, each cable is run laterally outwardly and around a pulley 46, then inwardly and around a pulley 42, then outwardly again and around a pulley 48, then transversely forwardly and around a pulley 50, then inwardly and toward the large idler sheave 25 and sleeve 28. These ends of the cable 45 are connected to the sleeve 28 as by anchors 54.

Each anchor 54 for a cable end 45 is carried on a side plate 55 attached to one end of the sleeve 28 and movable therewith longitudinally along the stationary shaft 22. The dual side plates are connected together at their free ends as by a series of bolts 56 and spacers 57. As best shown in FIG. 1, it is preferred that the side plates 55 be stabilized as by a small shaft or rod 58 which extends between side frame members having ends mounted thereon as by brackets 59. A spacer bushing 60 mounted between the side plates 55 slidably engages the shaft 58.

Figure 3:
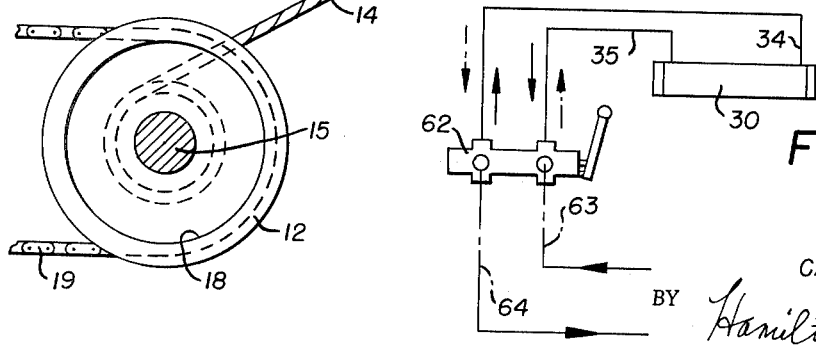
FIG. 3 is a schematic view of certain piping and control valving which may be utilized in the operational control of a hoist according to the invention.

Referring to the schematic piping view FIG. 3, the pressure fluid conduits 34, 35 are preferably run in parallel relation from the cylinder 30 to a remotely located four-way valve 62. A valve 62 has a shut-off position (62A), a supply to conduit 34—exhaust from conduit 35 position (62B), a supply to conduit 35—exhaust from conduit 34 position (62C), and a neutral or by-pass position (62D) for free circulation between conduits 34 and 35 within the body of the valve 62. Beyond the valve conduit 63 is for supply and conduit 64 is for return, from and to a source of fluid under pressure (not shown).

When used as the bull reel drum of a portable well drilling machine, the hoist 10 has two functions. First, to lower or raise equipment, such as drill pipes, bits, etc., into and out of the well hole. During these operations the cable 45 is wound in multiple layers on the drum 11. The second use is the actual drilling operation during which the cable 14 is payed out or unwound in small increments.

At the beginning of the cable raise or lower operation, the control handle of the valve 62 is actuated to transmit fluid to cylinder 30. Using FIG. 1 as a representative illustration, to move the sheave 25 to the chain line position, the valve 62 would be placed in position 62C to supply through conduit 35 and exhaust through conduit 34. When the sheave is in position, the valve is placed in the neutral position 62D. The drum 11 is then driven through chain 19 to move the cable 14. As the cable moves, the side draft thereof will force the sheave longitudinally along the stationary shaft 22.

The side draft force of the cable 14 is transmitted, through the linkage of the cable 45 as trained around each set of pulleys 42, 46, 48 and 50, to the piston 36 in cylinder 30. The pressure of fluid being displaced by movement of the piston is transmitted through conduits 34 and 35 and through valve 62 in the 62D position to be reintroduced in the cylinder on the opposite side of the piston 36. Referring again to FIG. 1, as the sheave 25 would move under the side draft force exerted by the cable 14 from the chain line position toward the full line position, the pressure of fluid displaced by movement of the piston 36 toward conduit 35 would be introduced through conduit 34.

From the description above, it will now be appreciated that the mechanical advantage provided by training the cables 45 around the pulley sets 42, 46, 48 and 50, and the fluid pressure by-pass provided by the valve in the 62D position, is such that the sidewise movement of the sheave 25 is accompanied by a balance of forces. That is, while the primary force is that of pushing by the cable 14 against the sheave 25, a strong supplemental force is that of "pulling" by a cable 45 on the sheave sleeve 28. Thus, the previous disadvantage of friction drive systems resulting in decreased cable life is eliminated.

For the actual drilling operation, the sheave 25 should be positioned so as to align the cable with the working components of the drill structure (not shown) such as a tail sheave, spudding sheave and crown sheave. The sheave 25 is located by selective placing of the valve 62 in either the 62B or 62C position. Then, the valve 62 is placed in the 62A position so as to maintain the sheave 25 in the desired location.

While a preferred form of the invention has been shown and described, a form particularly suited for use as the bull reel drum of portable well drilling machines, it should be clear that the concepts of the invention could be employed for hoists 10 used in other applications. Therefore, the true spirit of the invention should be determined solely by the scope of the claims.

What is claimed is:

1. In a hoist having a drum for winding a hoist cable, said drum being rotatably mounted on a frame, a stationary shaft mounted on said frame parallel to said drum, a sleeve slidable longitudinally of said stationary shaft, an idler sheave rotatably carried by said sleeve, a fluid cylinder mounted on said frame substantially parallel to said stationary shaft, a piston within said cylinder, piston shaft connected by said piston extending from either end of said cylinder, an idler pulley and cable anchor fitting on the end of each piston shaft, as least two idler pulleys mounted on said frame adjacent and laterally of each piston shaft, at least one idler pulley mounted on said frame adjacent to each end of said stationary shaft, and dual control cables extending one from each of the anchors on said fittings and trained around said adjacent idler pulleys and connected to said sleeve on opposite sides of said sheave.

2. In a hoist having a drum for winding a hoist cable, said drum being rotatably mounted on a frame, a stationary shaft mounted on said frame parallel to said drum, an idler sheave for engaging said hoist cable rotatably carried on said shaft and slidable longitudinally thereon, and means for controlling the location of said sheave in relation to the location of said hoist cable on said drum, said control means including: a fluid cylinder 30 having a piston 36 connecting opposed piston shafts 38, 39, a fitting 40 on the end of each piston shaft, each fitting mounting an idler pulley 42 and an anchor 44 for one end of dual control cables 45, at least three idler pulleys 46, 48, 50 mounted on said frame adjacent each piston shaft fitting, one of said control cables 45 being trained from each anchor 44 around said adjacent pulleys and being connected (as at 54) to one side of said idler sheave, dual conduits 34, 35 extending from said cylinder 30 on opposite sides of said piston 36, and valve means 62 for selective supply and/or exhaust of fluid under pressure to said cylinder through said conduits.

References Cited in the file of this patent

UNITED STATES PATENTS

| | | |
|---|---|---|
| 941,722 | Multon | Nov. 30, 1909 |
| 1,566,641 | Bell | Dec. 22, 1925 |
| 2,192,201 | Peppard | Mar. 5, 1940 |
| 2,228,346 | Downie | Jan. 14, 1941 |
| 2,595,584 | Jones | May 6, 1952 |
| 2,990,136 | Wilkinson | June 27, 1961 |

UNITED STATES PATENT OFFICE
CERTIFICATE OF CORRECTION

Patent No. 3,144,998                      August 18, 1964

Carl F. Back

It is hereby certified that error appears in the above numbered patent requiring correction and that the said Letters Patent should read as corrected below.

Column 4, line 54, for "shaft" read -- shafts --; column 6, line 3, for "Multon" read -- Moulton --.

Signed and sealed this 15th day of December 1964.

(SEAL)
Attest:

ERNEST W. SWIDER
Attesting Officer

EDWARD J. BRENNER
                                           Commissioner of Patents